(12) United States Patent
Li

(10) Patent No.: US 11,112,848 B2
(45) Date of Patent: Sep. 7, 2021

(54) VR HEADSET WITH PRESSURE SENSOR AND DISTANCE SENSOR AND METHOD FOR CONTROLLING VR HEADSET

(71) Applicant: GOERTEK TECHNOLOGY CO., LTD., Qingdao (CN)

(72) Inventor: Shaoxiang Li, Qingdao (CN)

(73) Assignee: GOERTEK TECHNOLOGY CO., LTD, Qingdao (CN)

( * ) Notice: Subject to any disclaimer, the term of this patent is extended or adjusted under 35 U.S.C. 154(b) by 115 days.

(21) Appl. No.: 16/347,875

(22) PCT Filed: Dec. 29, 2016

(86) PCT No.: PCT/CN2016/113086
§ 371 (c)(1),
(2) Date: May 7, 2019

(87) PCT Pub. No.: WO2018/086223
PCT Pub. Date: May 17, 2018

(65) Prior Publication Data
US 2019/0354161 A1 Nov. 21, 2019

(30) Foreign Application Priority Data
Nov. 8, 2016 (CN) .......................... 201610979736.7

(51) Int. Cl.
*G06F 1/3231* (2019.01)
(52) U.S. Cl.
CPC .................. *G06F 1/3231* (2013.01)

(58) Field of Classification Search
CPC ...... G06F 1/3231; G06F 1/3265; G06F 1/163; G02B 27/017
See application file for complete search history.

(56) References Cited

U.S. PATENT DOCUMENTS

2007/0121959 A1* 5/2007 Philipp ................ H04R 1/1041
381/74
2010/0227779 A1* 9/2010 Aakvik .................. C12N 15/74
506/26
2017/0045928 A1* 2/2017 Ishikawa ................. G06F 1/325
(Continued)

FOREIGN PATENT DOCUMENTS

JP 102346306 A 2/2012
JP 102893236 A 1/2013
(Continued)

*Primary Examiner* — Raymond N Phan
(74) *Attorney, Agent, or Firm* — Ajay A. Jagtiani; Miles & Stockbridge P.C.

(57) ABSTRACT

A VR headset and a method for controlling a VR headset are provided. The VR headset comprises a wakeup/sleep control circuit, at least one pressure sensor and at least one distance sensor, the pressure sensor and the distance sensor each being electrically connected with the wakeup/sleep control circuit, wherein the pressure sensor is provided at an upper frame and/or a lower frame of the VR headset, and the distance sensor is provided at an inner side of the VR headset, the inner side of the VR headset referring to a side of the VR headset that is adjacent to a face of a user wearing the VR headset. The VR headset provides a hardware basis for an automatic wakeup/sleep control of the VR headset.

14 Claims, 2 Drawing Sheets

(56) References Cited

U.S. PATENT DOCUMENTS

| | | | |
|---|---|---|---|
| 2017/0307891 A1* | 10/2017 | Bucknor | G01S 1/70 |
| 2018/0164849 A1* | 6/2018 | Chan | G06F 1/163 |
| 2018/0364790 A1* | 12/2018 | Thorgeirson | G06F 1/3265 |
| 2019/0011686 A1* | 1/2019 | Weida | G02B 21/00 |
| 2019/0033624 A1* | 1/2019 | Breuninger | G02C 13/005 |
| 2019/0064522 A1* | 2/2019 | Reif | G06F 1/3212 |
| 2019/0073812 A1* | 3/2019 | DeBates | G01J 5/0025 |
| 2019/0107885 A1* | 4/2019 | Zhao | G06F 1/163 |
| 2019/0254519 A1* | 8/2019 | Garcia Ramos | A61B 3/09 |
| 2019/0353909 A1* | 11/2019 | Yin | G02B 27/0172 |

FOREIGN PATENT DOCUMENTS

| | | |
|---|---|---|
| JP | 103838372 A | 6/2014 |
| JP | 104461640 A | 3/2015 |
| JP | 104808777 A | 7/2015 |
| JP | 105183138 A | 12/2015 |
| JP | 105278691 A | 1/2016 |
| JP | 105912109 A | 8/2016 |
| JP | 105929926 A | 9/2016 |
| WO | 2015/127146 A1 | 8/2015 |

\* cited by examiner ing. Another objective of the present invention is to provide a method for controlling a VR headset, which achieves automatic wakeup/sleep of the VR headset.

VR HEADSET WITH PRESSURE SENSOR AND DISTANCE SENSOR AND METHOD FOR CONTROLLING VR HEADSET

CROSS-REFERENCE TO RELATED APPLICATIONS

This application is a National Stage of International Application No. PCT/CN2016/113086, filed on Dec. 29, 2016, which claims priority to Chinese Patent Application No. 201610979736.7, filed on Nov. 8, 2016, both of which are hereby incorporated by reference in their entireties.

TECHNICAL FIELD

The present invention relates to the virtual reality (VR) technology, and more particularly, to a VR headset and a method for controlling a VR headset.

BACKGROUND

With the advancement of the virtual reality technology, VR headsets become more and more popular. In the prior art, sleep of a VR headset is generally initiated by a sleep switch. When a user turns on the sleep switch, the VR headset enters a sleep state. Then, the user can turn off the sleep switch to wake up the VR headset. This is relatively cumbersome, and the user needs to actively turn on the switch, resulting in poor user experience. Therefore, it is necessary to provide a new technical solution for a sleep/wakeup control of the VR headset.

SUMMARY

An objective of the present invention is to provide a VR headset, which provides a hardware basis for an automatic wakeup/sleep control of the VR headset. Another objective of the present invention is to provide a method for controlling a VR headset, which achieves automatic wakeup/sleep of the VR headset.

According to a first aspect of the present invention, there is provided A VR headset, comprising a wakeup/sleep control circuit, at least one pressure sensor and at least one distance sensor, the pressure sensor and the distance sensor each being electrically connected with the wakeup/sleep control circuit, wherein the pressure sensor is provided at an upper frame and/or a lower frame of the VR headset, and the distance sensor is provided at an inner side of the VR headset, the inner side of the VR headset referring to a side of the VR headset that is adjacent to a face of a user wearing the VR headset.

Optionally, the wakeup/sleep control circuit is integrated in a processor of the VR headset.

Optionally, the VR headset further comprises a system power source control module, the wakeup/sleep control circuit being electrically connected to a control terminal of the system power source control module.

Optionally, the upper frame and/or the lower frame of the VR headset is provided with a groove, the pressure sensor being embedded in the groove.

Optionally, the pressure sensor comprises a plurality of pressure sensors evenly distributed in the upper frame and the lower frame of the VR headset.

Optionally, the pressure sensor comprises a plurality of pressure sensors evenly distributed at left and right ends of the upper frame of the VR headset and left and right ends of the lower frame of the VR headset.

Optionally, the distance sensor is provided between a left lens and a right lens of the VR headset.

According to a second aspect of the present invention, there is provided a method for controlling a VR headset, comprising the following steps of:

reading data of an external pressure applied to the VR headset and data of a distance between the VR headset and a face of a user; and controlling the VR headset to enter a sleep/wakeup state according to the external pressure applied to the VR headset and the distance between the VR headset and the face of the user.

Optionally, the controlling the VR headset to enter a sleep/wakeup state according to the external pressure applied to the VR headset and the distance between the VR headset and the face of the user comprises:

detecting whether a sleep condition is met, and controlling the VR headset to enter the sleep state when the sleep condition is met, the sleep condition being that the last change in the external pressure applied to the VR headset is a decrease in pressure and the last change in the distance between the VR headset and the face of the user is an increase in distance.

Optionally, the sleep condition is that the last change in the external pressure applied to the VR headset is the decrease in pressure, and the last change in the distance between the VR headset and the face of the user is the increase in distance, and currently the distance between the VR headset and the face of the user is longer than a predetermined first distance threshold.

Optionally, the controlling the VR headset to enter a sleep/wakeup state according to the external pressure applied to the VR headset and the distance between the VR headset and the face of the user comprises:

detecting whether a wakeup condition is met, and waking up the VR headset when the wakeup condition is met, the wakeup condition being that the last change in the external pressure applied to the VR headset is an increase in pressure, and the last change in the distance between the VR headset and the face of the user is a decrease in distance.

Optionally, the wakeup condition is that the last change in the external pressure applied to the VR headset is the increase in pressure, and the last change in the distance between the VR headset and the face of the user is the decrease in distance, and currently the distance between the VR headset and the face of the user is longer than a predetermined second distance threshold.

Optionally, the controlling the VR headset to enter a sleep/wakeup state according to the external pressure applied to the VR headset and the distance between the VR headset and the face of the user comprises:

detecting whether the sleep condition is met, and controlling the VR headset to enter the sleep state when the sleep condition is met, the sleep condition being that the external pressure applied to the VR headset is less than a predetermined first pressure threshold and the distance between the VR headset and the face of the user is greater than the predetermined first distance threshold.

Optionally, the controlling the VR headset to enter a sleep/wakeup state according to the external pressure applied to the VR headset and the distance between the VR headset and the face of the user comprises:

detecting whether a wakeup condition is met, and waking up the VR headset when the wakeup condition is met, the wakeup condition being that the external pressure applied to the VR headset is greater than a set second pressure threshold and the distance between the VR headset and the face of the user is less than the predetermined second distance threshold.

The VR headset provided by the present invention provides a hardware foundation for the automatic wake/sleep control. The present invention optimizes the sleep/wakeup solution of the VR headset by adding the pressure sensor and the distance sensor to the VR headset. The pressure sensor can conveniently and quickly monitor the operation of the VR headset by the user. The auxiliary distance sensor monitors a change in the distance from the face of the user to the VR headset. After a comprehensive judgment, the VR headset is automatically controlled to be waked up/slept, without requiring the user to perform additional actions such as turning on the sleep switch. The operation is simple and convenient, and a good user experience is provided for the user.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION

Figure 1:
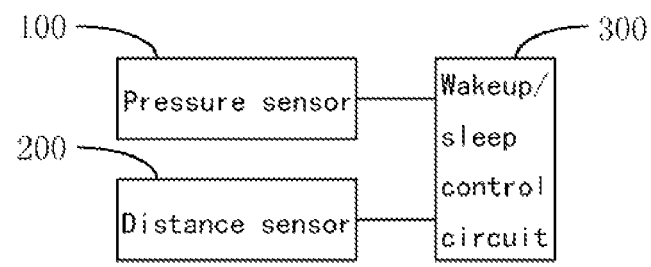
FIG. 1 is a circuit block diagram of a VR headset according to an embodiment of the present invention.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the disclosure, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

According to the present invention, a pressure sensor and a distance sensor are added to a VR headset. The pressure sensor is configured to monitor an external pressure applied to the VR headset. The distance sensor is configured to monitor a distance between the VR headset and a face of a user. Pressure and distance data are simultaneously utilized to determine an operation of the user on the VR headset, thereby controlling the VR headset to automatically enter a wakeup/sleep state.

After the VR headset is started up, the external pressure applied to the VR headset and the distance between the VR headset and the face of the user are periodically monitored at a certain interval.

The data of the external pressure applied to the VR headset and the data of the distance between the VR headset and the face of the user are read. When the user holds the VR device, the external pressure applied to the VR headset can increase. When the user may releases the VR headset, the external applied to the VR headset can decrease. When the user is wearing the VR headset, the distance between the face of the user and the VR headset can decrease. When the user is taking off the VR headset, the distance between the VR headset and the face of the user can increase.

The VR headset is controlled to enter the sleep/wakeup state according to the external pressure applied to the VR headset and the distance between the VR headset and the face of the user. Since the external pressure applied to the VR headset and the distance between the VR headset and the face of the user are considered at the same time, a use condition from the user can be relatively accurately determined to prevent misoperations. The present invention provides two approaches to control the VR headset to enter the sleep/wakeup state.

In the first approach, the VR headset is controlled to enter the sleep/wakeup state according to a change in the external pressure applied to the VR headset and a change in the distance between the VR headset and the face of the user.

Theoretically, when an increase in the external pressure applied to the VR headset and a decrease in the distance between the VR headset and the face of the user happen, it is indicated the user is going to use the VR headset, but the increase in the external pressure applied to the VR headset and the decrease in the distance between the VR headset and the face of the user may not occur synchronously. For example, the user firstly holds the VR headset, at this point, the external applied to the VR headset increases, and then the user moves the VR headset to the face for wearing. The distance between the VR headset and the face of the user decreases when moving the VR headset for wearing, but the external pressure applied to the VR headset can remain unchanged. Similarly, when a decrease in the external pressure applied to the VR headset and an increase in distance between the VR headset and the face of the user happen, it is indicated that the user is going to stop using the VR headset. However, the decrease in the external pressure applied to the VR headset and the increase in the distance between the VR headset and the face of the user may not occur synchronously.

The first approach is to enable the VR headset to be woke up/slept according to the last change in the external pressure applied to the VR headset and the last change in the distance between the VR headset and the face of the user.

When the last change in the external pressure applied to the VR headset is a decrease in pressure and the last change in the distance between the VR headset and the face of the user is an increase in distance, the VR headset is controlled to enter the sleep state, i.e., a sleep condition of the VR headset is that the last change in the external pressure applied to the VR headset is the decrease in pressure, and the last change in the distance between the VR headset and the face of the user is the increase in distance.

If the last change in the external pressure applied to the VR headset is an increase in pressure and the last change in the distance between the VR headset and the face of the user is a decrease in distance, the VR headset is woke up, i.e., a wakeup condition of the VR headset is that the last change in the external pressure applied to the VR headset is the increase in pressure, and the last change in the distance of the VR headset from the face of the user is the decrease in distance.

In the first approach, the sleep condition of the VR headset is that the last change in the external pressure applied to the VR headset is a decrease in pressure and the last change in the distance between the VR headset and the face of the user is the increase in distance. The wakeup condition of the VR headset is that the last change in the external pressure applied to the VR headset is an increase in pressure and the last change in the distance between the VR headset and the face of the user is a decrease in distance, thereby improving the accuracy of the wakeup/sleep operation and preventing misoperations. When what happens is only one of the following conditions: the last change in the external pressure applied to the VR headset is a decrease in pressure and the last change in the distance between the VR headset, and the face of the user is the increase in distance, the state of the VR headset does not change. Similarly, when what happens is only one of the following conditions: the last change in the external pressure applied to the VR headset is the increase in pressure, and the last change in the distance between the VR headset and the face of the user is the decrease in distance, the state of the VR headset does not change either.

For example, the VR headset is initially in the wakeup state, and the last change in the distance between the VR headset and the face of the user is monitored as the increase in distance, but the last change in the external pressure applied to the VR headset is not the decrease in pressure, it is indicated that the VR headset is moved away from a head of the user but the user does not release the VR headset. The user can only adjust a wearing posture, and the VR headset maintains the previous wakeup state.

For example, the VR headset is initially in the wakeup state, and the last change in the external pressure applied to the VR headset is monitored as the decrease in the external pressure but the last change in the distance between the VR headset and the face of the user is not the increase in distance, it is indicated that the user releases the VR headset but does not take off the VR headset. The VR headset maintains the previous wakeup state.

For example, the VR headset is initially in the sleep state, and the last change in the external pressure applied to the VR headset is monitored as the increase in pressure, but the last change in the distance between the VR headset and the face of the user is not the decrease in distance, it is indicated that the user holds the VR headset but the VR headset does not approach the face of the user. It is indicated that the user is not about to wear the VR headset, and the VR headset remains the previous sleep state.

In other embodiments, in order to further prevent the misoperations, the sleep condition can be further extended to that the last change in the external pressure applied to the VR headset is the decrease in pressure, the last change in the distance between the VR headset and the face of the user is the increase in distance, and currently the distance between the VR headset and the face of the user is longer than a predetermined first distance threshold. The first distance threshold can be predetermined at the factory or by the user. The first distance threshold can be for example 4 cm.

In other embodiments, in order to further prevent the misoperations, the wakeup condition can be further extended to that the last change in the external pressure applied to the VR headset is the increase in pressure, the last change in the distance between the VR headset and the face of the user is the decrease in distance, and currently the distance between the VR headset and the face of the user is less than a predetermined second distance threshold. The second distance threshold can be predetermined at the factory or by the user. The second distance threshold can be for example 2 cm.

In the second approach, a relationship between the external pressure applied to the VR headset and a first pressure threshold and a second pressure threshold is judged, and the relationship between the distance between the VR headset and the face of the user and the first distance threshold and the second distance threshold is judged, to control the VR headset to enter the sleep/wakeup state.

When the external pressure applied to the VR headset is less than the predetermined first pressure threshold and the distance between the VR headset and the face of the user is greater than the predetermined first distance threshold, it is indicated that the user does not use the VR headset, and then the VR headset is controlled to enter the sleep state.

When the external pressure applied to the VR headset is greater than the predetermined second pressure threshold and the distance between the VR headset and the face of the user is less than the predetermined second distance threshold, it is indicated that the user is going to use the VR headset, the VR headset is woke up.

The first and second pressure thresholds in the second approach and the first and second distance thresholds can be set at the factory or by the user. The first distance threshold can be for example 4 cm, and the second distance threshold can be for example 2 cm.

In order to prevent the misoperations, when what happens is only one of the following conditions: the external pressure applied to the VR headset is less than the predetermined first pressure threshold and the distance between the VR headset, and the face of the user is greater than the predetermined first distance threshold, the VR headsets remains the previous state. When what happens is only one of the following conditions: the external pressure applied to the VR headset is greater than the predetermined second pressure threshold, and the distance between the VR headset and the face of the user is less than the predetermined second distance threshold, the VR headset remains the previous state.

Referring to FIGS. 1-5, an embodiment of the invention further provides a VR headset, which provides a hardware foundation for performing automatic wakeup/sleep thereof.

The VR headset according to the embodiment of the present invention is described with reference to FIG. 1. The VR headset comprises a wakeup/sleep control circuit 300, at least one pressure sensor 100, and at least one distance sensor 200. The pressure sensor 100 and the distance sensor 200 are respectively and electrically connected to the wakeup/sleep control circuit 300. In one embodiment, the wakeup/sleep control circuit 300 is electrically connected to the control terminal of a system power source control module, so as to control the system to enter a wakeup or sleep state according to the foregoing method.

Figure 2:
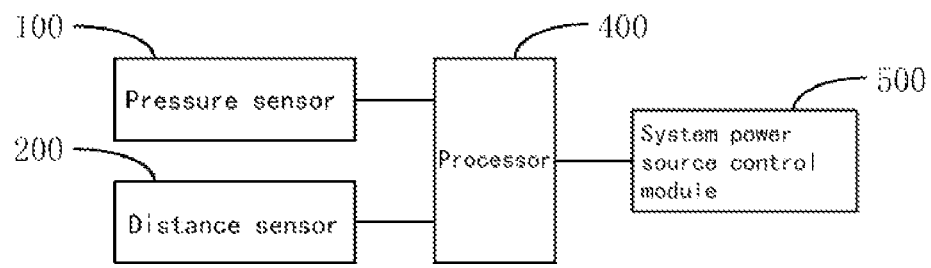
FIG. 2 is a circuit block diagram of a VR headset according to another embodiment of the present invention.

Referring to FIG. 2, in one embodiment, the wakeup/sleep control circuit can be integrated in a processor 400 of the VR headset, that is, the processor 400 of the VR headset has a function of controlling the peripheral modules of the processor 400 and the processor 400 per se to enter the sleep and wakeup states. The VR headset further comprises a memory for storing instructions. The instructions are configured to control the processor 400 to perform corresponding operations so as to implement the above method for controlling a VR headset. In one embodiment, the processor 400 is electrically connected to the control terminal of the system power source control module 500.

Figure 3:
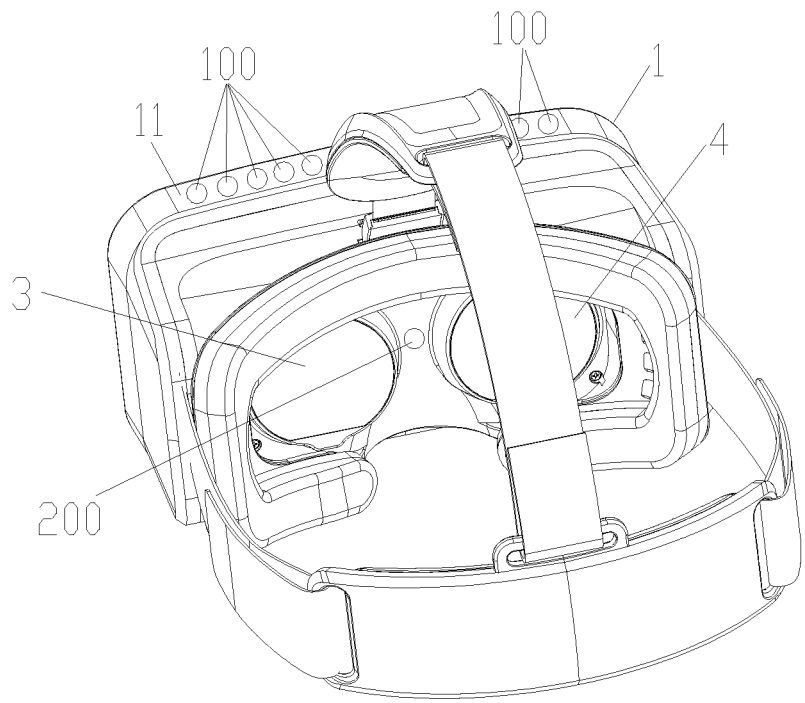
FIG. 3 is a schematic perspective view of a VR headset provided by an embodiment of the present invention.
Figure 4:
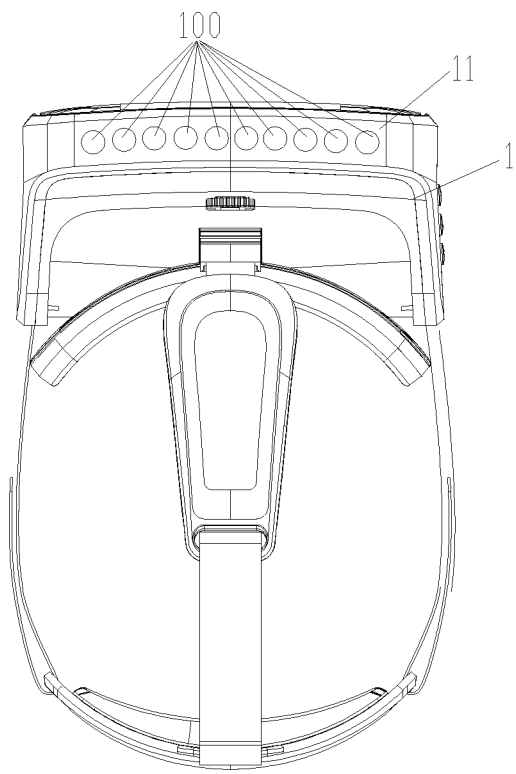
FIG. 4 is a top view of a VR headset provided by the embodiment of the present invention.
Figure 5:
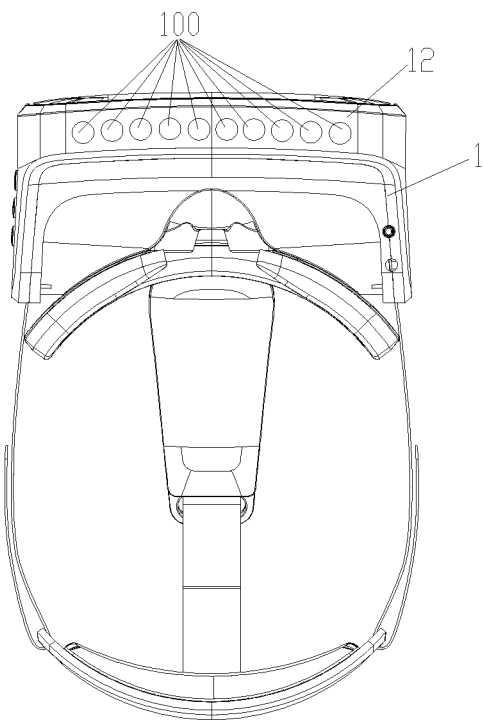
FIG. 5 is a bottom view of a VR headset provided by the embodiment of the present invention.

As can be seen from FIGS. 3 to 5, the pressure sensors 100 are evenly distributed at an upper frame 11 and a lower frame 12 of the VR headset 1. Grooves can be provided in the upper frame 11 and the lower frame 12 of the VR headset, and the pressure sensors 100 are embedded in the grooves and the form a flat surface with the upper frame 11 or the lower frame 12. The distance sensor 200 can be an infrared sensor or an ultrasonic sensor, and can be provided at an inner side of the VR headset 1 and located between a left lens 3 and a right lens 4 of the VR headset 1. The inner side of the VR headset 1 refers to a side of the VR headset that is adjacent to the user wearing the VR headset 1.

The pressure sensors are placed at the upper and lower frames of the VR headset, since the user is usually accustomed to hold the upper and lower frames with the thumb and the rest of fingers, and the pressure sensors are provided at these positions, which is more consist with operation habits of the user. In other embodiments, the pressure sensors can be provided only at the upper frame of the VR headset. In other embodiments, the pressure sensors can be provided only at t the lower frame of the VR headset. In other embodiments, only one pressure sensor can be provided at the VR headset. In other embodiments, a plurality of pressure sensors can be provided and evenly distributed on left and right ends of the upper frame of the VR headset and left and right ends of the lower frame of the VR headset.

In the embodiment shown in FIG. 3, the distance sensor 200 is located between the left lens 3 and the right lens 4 of the VR headset 1. In other embodiments, the distance sensor can also be located at a position on the left of the left lens or on the right of the right lens of the VR headset 1.

The VR headset provided by the present invention provides a hardware foundation for the automatic wakeup/sleep control thereof. The invention optimizes the sleep/wakeup solution of the VR headset by adding the pressure sensor and the distance sensor to the VR headset. Since the pressure sensor can conveniently and quickly monitor operations to the VR headset by the user, and the auxiliary distance sensor monitors the change in the distance from the face of the user to the VR headset. After a comprehensive judgment, the VR headset is automatically controlled to be waked up/slept. The user is not required to perform additional actions such opening a sleep switch, so the operation is simple and convenient, and a good user experience is provided for the user.

Although some specific embodiments of the present disclosure have been demonstrated in detail with examples, it should be understood by a person skilled in the art that the above examples are only intended to be illustrative but not to limit the scope of the present disclosure. It should be understood by those skilled in the art that the above embodiments could be modified without departing from the scope and spirit of the present disclosure. The scope of the present disclosure is defined by the appended claims.

The invention claimed is:

1. A method for controlling a VR headset, wherein the method is performed by a processor in the VR headset configured with instructions and comprises the following steps of:

Reading, by the processor configured with the instructions, data of an external pressure applied to the VR headset and data of a distance between the VR headset and a face of a user; and controlling, by the processor configured with the instructions, the VR headset to enter a sleep/wakeup state according to the external pressure applied to the VR headset and the distance between the VR headset and the face of the user, wherein the controlling, by the processor configured with the instructions, the VR headset to enter a sleep/wakeup state according to the external pressure applied to the VR headset and the distance between the VR headset and the face of the user comprises:

detecting, by the processor configured with the instructions, whether a sleep condition is met, and controlling the VR headset to enter the sleep state when the sleep condition is met, the sleep condition being that the last change in the external pressure applied to the VR headset is a decrease in pressure and the last change in the distance between the VR headset and the face of the user is an increase in distance.

2. The method according to claim 1, wherein the sleep condition is that the last change in the external pressure applied to the VR headset is the decrease in pressure, and the last change in the distance between the VR headset and the face of the user is the increase in distance, and currently the distance between the VR headset and the face of the user is longer than a predetermined first distance threshold.

3. The method according to claim 1, wherein the controlling, by the processor configured with the instructions, the VR headset to enter a sleep/wakeup state according to the external pressure applied to the VR headset and the distance between the VR headset and the face of the user comprises:

detecting, by the processor configured with the instructions, whether a wakeup condition is met, and waking up the VR headset when the wakeup condition is met, the wakeup condition being that the last change in the external pressure applied to the VR headset is an increase in pressure, and the last change in the distance between the VR headset and the face of the user is a decrease in distance.

4. The method according to claim 1, wherein the controlling, by the processor configured with the instructions, the VR headset to enter a sleep/wakeup state according to the external pressure applied to the VR headset and the distance between the VR headset and the face of the user comprises:

detecting, by the processor configured with the instructions, whether the sleep condition is met, and controlling the VR headset to enter the sleep state when the sleep condition is met, the sleep condition being that the external pressure applied to the VR headset is less than a predetermined first pressure threshold and the distance between the VR headset and the face of the user is greater than the predetermined first distance threshold.

5. A VR headset for performing the method according to claim 1, comprising a wakeup/sleep control circuit, at least one pressure sensor and at least one distance sensor, the pressure sensor and the distance sensor each being electrically connected with the wakeup/sleep control circuit, wherein the pressure sensor is provided at an upper frame and/or a lower frame of the VR headset, and the distance sensor is provided at an inner side of the VR headset, the inner side of the VR headset referring to a side of the VR headset that is adjacent to a face of a user wearing the VR headset.

6. The method according to claim 3, wherein the wakeup condition is that the last change in the external pressure applied to the VR headset is the increase in pressure, and the last change in the distance between the VR headset and the face of the user is the decrease in distance, and currently the distance between the VR headset and the face of the user is longer than a predetermined second distance threshold.

7. The method according to claim 4, wherein the controlling, by the processor configured with the instructions, the VR headset to enter a sleep/wakeup state according to the external pressure applied to the VR headset and the distance between the VR headset and the face of the user comprises:

detecting, by the processor configured with the instructions, whether a wakeup condition is met, and waking up the VR headset when the wakeup condition is met, the wakeup condition being that the external pressure applied to the VR headset is greater than a set second pressure threshold and the distance between the VR headset and the face of the user is less than the predetermined second distance threshold.

8. The VR headset according to claim 5, wherein the wakeup/sleep control circuit is integrated in a processor of the VR headset.

9. The VR headset according to claim 5, further comprising a system power source control module, the wakeup/sleep control circuit being electrically connected to a control terminal of the system power source control module.

10. The VR headset according to claim 5, wherein the upper frame and/or the lower frame of the VR headset is provided with a groove, the pressure sensor being embedded in the groove.

11. The VR headset according to claim 5, wherein the pressure sensor comprises a plurality of pressure sensors evenly distributed in the upper frame and the lower frame of the VR headset.

12. The VR headset according to claim 5, wherein the pressure sensor comprises a plurality of pressure sensors evenly distributed at left and right ends of the upper frame of the VR headset and left and right ends of the lower frame of the VR headset.

13. The VR headset according to claim 5, wherein the distance sensor is provided between a left lens and a right lens of the VR headset.

14. The VR headset according to claim 11, wherein the pressure sensor is provided at an outer edge of a top of the upper frame and/or at an outer edge of a bottom of the lower frame of the VR headset.

\* \* \* \* \*